United States Patent [19]

Loskill

[11] 4,254,841
[45] Mar. 10, 1981

[54] LOAD CELL OVERLOAD PROTECTION DEVICE

[75] Inventor: Lawrence R. Loskill, Gary, Ind.

[73] Assignee: Maatschappij van Berkel's Patent N.V., Leidschendam, Netherlands

[21] Appl. No.: 85,509

[22] Filed: Oct. 17, 1979

[51] Int. Cl.³ ................ G01G 23/06; G01G 23/02
[52] U.S. Cl. ................................. 177/187; 177/154
[58] Field of Search .............. 177/184, 186, 187, 189, 177/154

[56] References Cited

U.S. PATENT DOCUMENTS

| 4,058,179 | 11/1977 | Price | 177/187 X |
| 4,136,750 | 1/1979 | Strickler | 177/189 |
| 4,170,270 | 10/1979 | Sette et al. | 177/184 |

OTHER PUBLICATIONS

Brendel, Albert E., Overload Protection in Electronic Weighing Systems-Part I, Sensor Developments, Box 290, Lake Orion, MI 48035.

Primary Examiner—George H. Miller, Jr.
Attorney, Agent, or Firm—Lloyd L. Zickert

[57] ABSTRACT

A device associated with a load cell for protecting against overload conditions, which includes a first bracket assembly connected to the load application portion of the load cell and a second bracket assembly slidably mounted on the first bracket assembly and connected thereto through elements that normally prohibit slidable movement between the bracket assemblies but permit slidable movement therebetween in a given overload situation.

14 Claims, 9 Drawing Figures

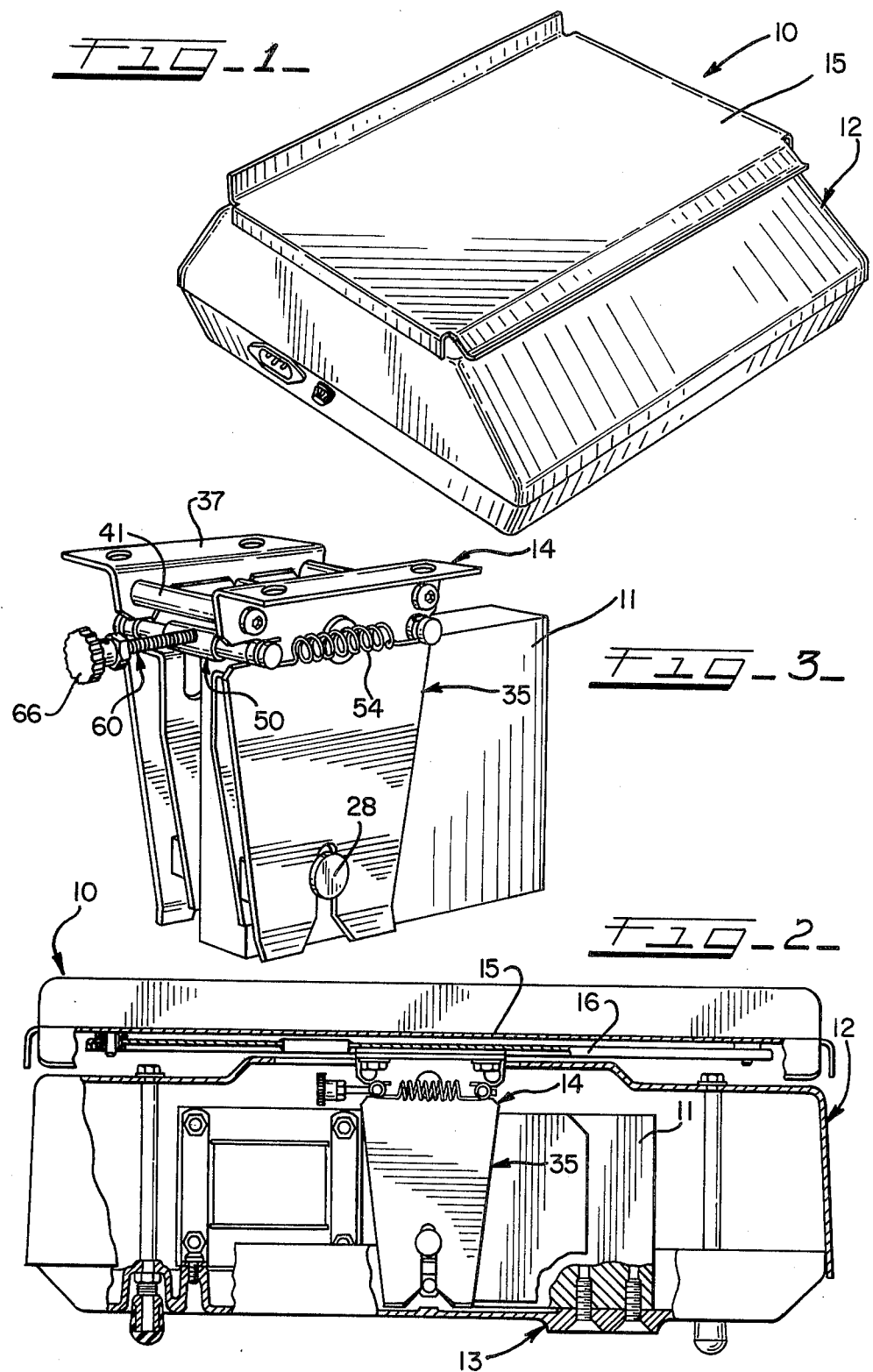

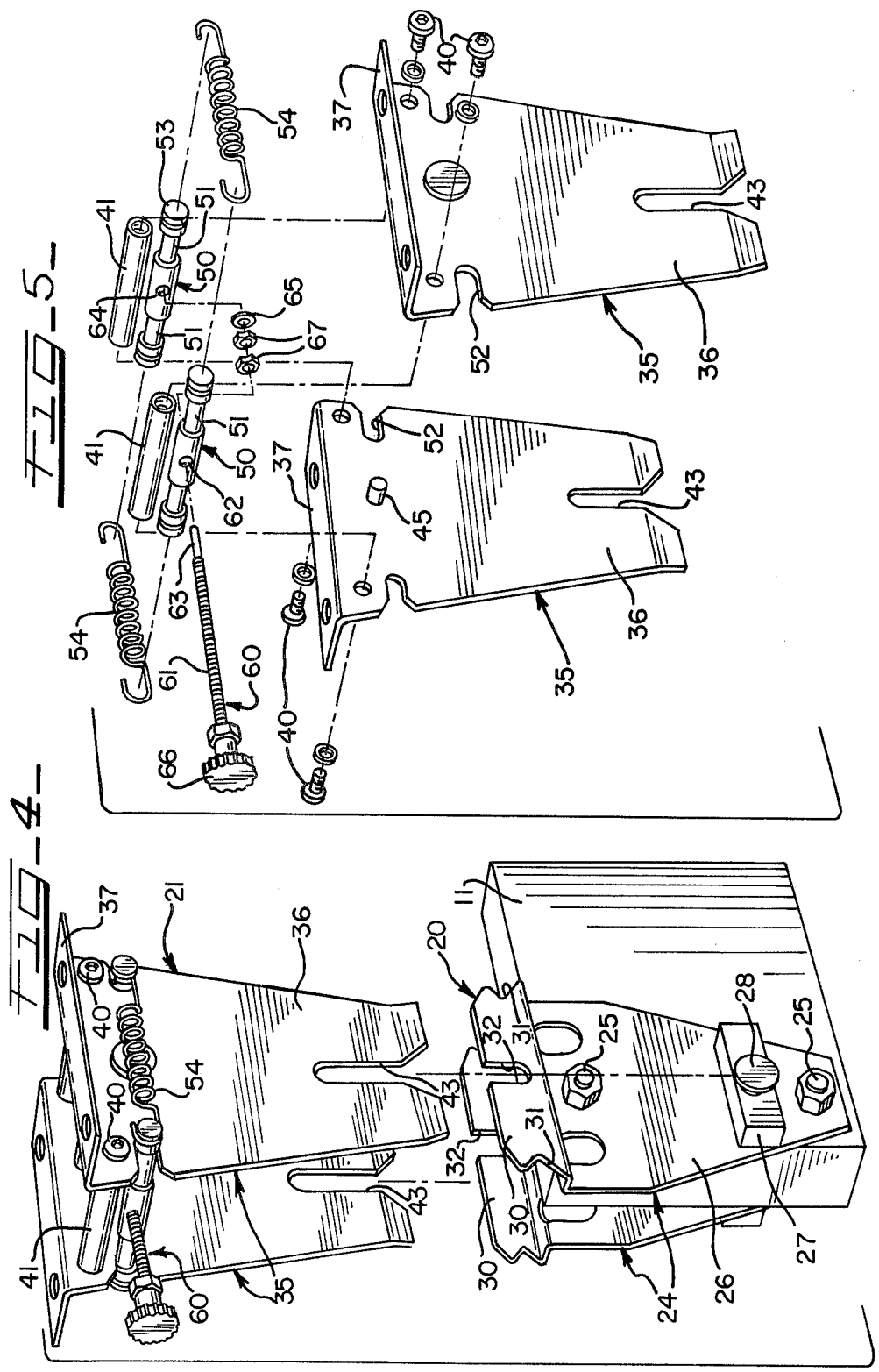

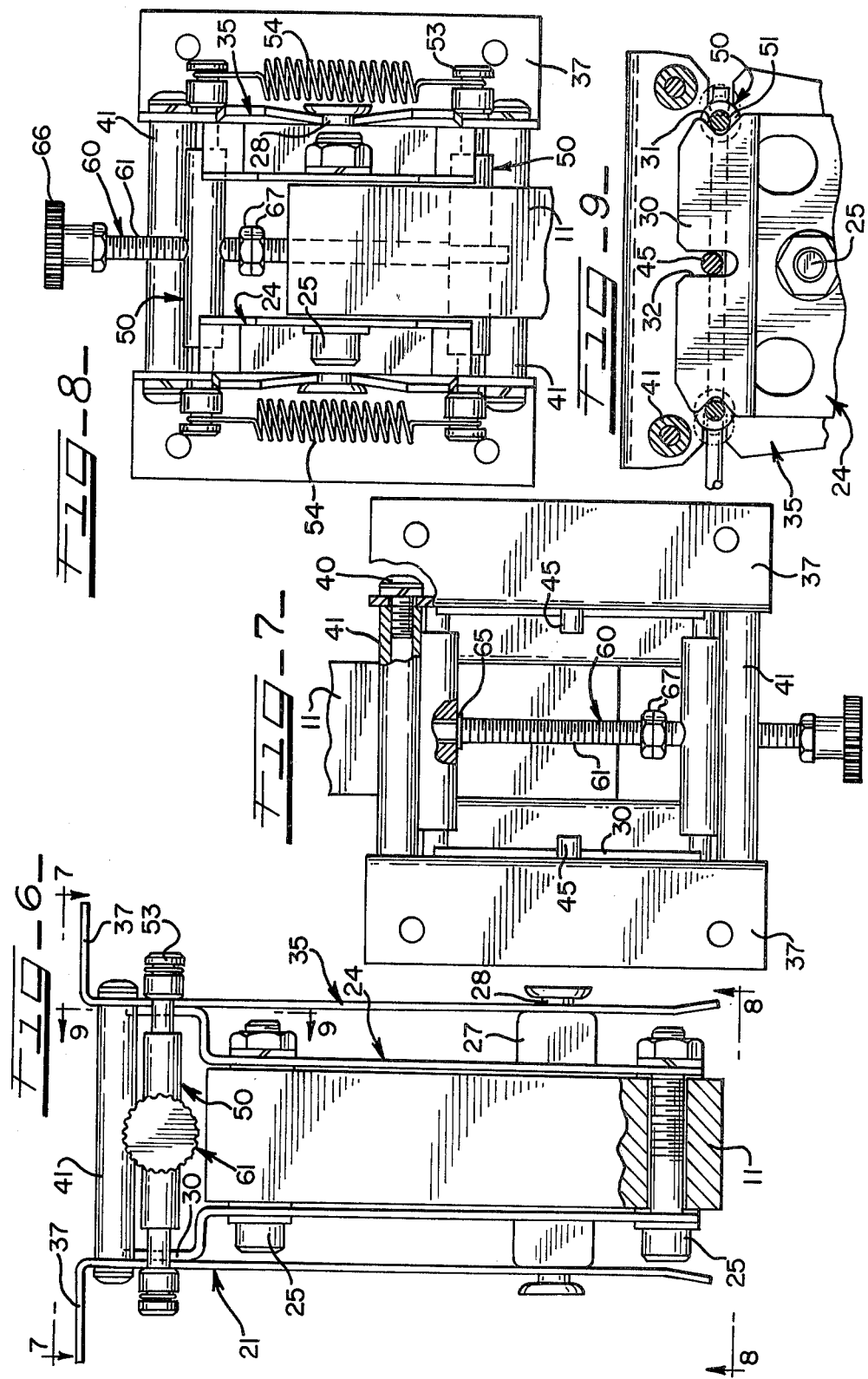

LOAD CELL OVERLOAD PROTECTION DEVICE

This invention relates in general to an overload protection device for a load cell, and more particularly, to an overload protection device for a load cell that is utilized in an electronic weighing system.

Load cells have been heretofore used in the electronic scale industry for the weighing of goods. Such a load cell usually includes a structural member which, when loaded with a force or weight, deforms or deflects like a cantilever spring. The deflection or deformation is then measured by a suitable electric sensing device, such as a strain gage. The satisfactory operability of such a load cell is limited by the magnitude of deflection or deformation the structural member can withstand, as well as the ability of the sensing device to tolerate the deformation or deflection. Thus, an unprotected load cell, when overloaded, will be damaged.

Heretofore known load cell overload protection devices have not had the ability to be easily assembled with or disassembled from the load cell. Moreover, known overload protectors have been complex in structure and expensive to manufacture.

The overload protection device of the present invention is applicable for any type of load cell and is especially suitable for load cells that are utilized in electronic weighing apparatus. The device of the present invention includes a first bracket assembly which is fixedly mounted to the load application portion of the load cell and a second bracket assembly for receiving the load or weighing force and being slidably mounted on the first bracket assembly. Connection means is provided for the first and second bracket assembly to prevent slidable movement therebetween when the second bracket assembly is subjected to normal loads, but which will allow relative slidable movement therebetween in the event that the second bracket assembly receives a load or weighing force of a magnitude deemed to be something less than that which would cause damage to the load cell. Further, the connection means is capable of resetting upon the removal of an overload. The connection means for the first and second bracket assemblies further includes elements for easily disconnecting the assembly such that any force applied to the second bracket assembly will not be transmitted to the first bracket assembly.

It is therefore an object of the present invention to provide a new and improved overload protection device for a load cell and particularly a protection device especially suitable for load cells which are utilized in electronic weighing scales.

A further object of this invention is to provide an overload protection device for a load cell that can be operated to prevent the application of any force to the load cell such as would be desired when the load cell is not in service, such as when it is in storage or in shipment.

A still further object of this invention is in the provision of an overload protection device for a load cell which will prevent damage to the load cell in the event of excessive downward or upward forces.

Another object of this invention is in the provision of an overload protection device for a load cell which is operable in the event either compressive or tensile forces are applied to the load cell.

A still further object of this invention is to provide an overload protection device for a load cell which will function to prevent damage to the load cell in the event the load cell is subjected to either compressive or tensile eccentric loading.

Another object of the invention is to provide an overload protection device for a load cell which is capable of transmitting an excessive or unsafe load or weighing force to a non-function position and which also is capable of returning all elements of the device to a functioning position when all excessive or unsafe loads are removed, whereby the device is self-resetting upon removal of an excessive load.

Other objects, features and advantages of the invention will be apparent from the following detailed disclosure, taken in conjunction with the accompanying sheets of drawings, wherein like reference numerals refer to like parts, in which:

FIG. 1 is a perspective view of a weighing apparatus of the electronic type which utilizes a load cell;

FIG. 2 is a vertical sectional view taken through the weighing apparatus shown in FIG. 1 with parts broken away to show underlying parts in the overload protection device of the present invention;

FIG. 3 is an enlarged perspective view of the overload protection device of the present invention and a generally block view of a load cell associated therewith;

FIG. 4 is a perspective view of the load cell of FIG. 3 but illustrating the bracket assemblies in disassembled positions for the purpose of illustrating the various parts of the device;

FIG. 5 is an exploded perspective view of the outside bracket assembly which is shown in assembled form in the upper part of FIG. 4 and which is shown in assembled relation to the inner bracket assembly of FIG. 3;

FIG. 6 is an enlarged front elevational view of the overload protection device as mounted on a load cell and with some parts broken away to show underlying parts;

FIG. 7 is a top plan view of the device shown in FIG. 6 and taken substantially along line 7—7 thereof and with some parts broken away to show underlying parts;

FIG. 8 is a bottom plan view of the device shown in FIG. 6 and taken substantially along line 8—8 thereof; and FIG. 9 is a detailed sectional view of the upper part of the overload protection device and taken substantially along line 9—9 of FIG. 6.

The overload protection device for load cells according to the present invention is illustrated in connection with an electronic weighing scale generally designated by the numeral 10 in FIGS. 1 and 2. As seen particularly in FIG. 2, a load cell 11 is arranged within the housing 12 of the scale and is securely mounted to the base 13. The overload protection device of the present invention is generally illustrated in FIG. 2 and designated by the numeral 14. This device is arranged between the load cell 11 and a weighing platform 15. More particularly, the weighing platform 15 is supported on a member 16 which is directly connected to the overload protection device. Thus, goods supported on the weighing platform or pan 15 transmit a force to the overload protection device and to the load cell 11.

While not illustrated, it will be appreciated that the load cell 11 may be of any suitable type having sensors which translate the force or load received by the load cell into a digital weight measurement. The load cell forms no part of the present invention and is generally illustrated in block form for purposes of illustrating the overload protection device of the present invention.

However, as shown in FIG. 2, the load cell 11 is essentially cantileverly supported and the overload protection device 14 is mounted on the load receiving portion of the cell. The assembled relationship between the load cell and the overload protection device is shown in FIG. 3 where the load cell and protection device are removed from the weighing apparatus. The details of the protection device are illustrated more particularly in FIGS. 4 to 9 and will be hereinafter described.

The protection device includes generally a first bracket assembly 20 which is rigidly secured to the load cell 11 and a second bracket assembly 21 which coacts with the first bracket assembly and is rigidly connected to the weighing platform support 16 to which the weighing force or load is applied. The second bracket assembly 21 is slidably and guidably mounted on the first bracket assembly 20 and connection means is provided to normally oppose relative sliding movement between the bracket assemblies and to allow sliding movement in the event that a weight force or load transmitted to the second bracket assembly 21 approaches a given weighing force or load that might damage the load cell.

The first bracket assembly includes a pair of opposed bracket plates 24 which are secured by fasteners 25 to the load receiving portion of the load cell 11. Each plate 24 includes a main body 26 in the form of a flat portion that fits against the opposite sides of the load receiving portion of the load cell and which are slightly spaced from the side surfaces of the load cell by washers mounted on the fasteners 25. Accordingly, the main body portions 26 of the plates will not interfere with the operation of the load cell mounted on the outer sides of the main body portions 26. Adjacent the lower ends of the plates are spacer bars 27 which in turn support guide pins 28. The pins 28 include a flange-like head for purposes which will be apparent during the description of the second bracket assembly and as can be seen in the drawings.

Offset cam plates 30 are provided at the upper ends of the main body portions 26. The outer surfaces of the cam plates 30 are vertically aligned with the outer surfaces of the spacer bars 27, as can be seen particularly in FIG. 6. Each cam plate includes a pair of opposed generally V-shaped cam surfaces 31 and a vertically oriented guide slot 32 which is vertically aligned with the guide pin 28 and which coacts with the second bracket assembly, as will be hereinafter described.

The second bracket assembly 21 which coacts with the first bracket assembly 20 includes a pair of opposed and identically formed bracket plates 35, each of which further includes a main body portion 36 and at the upper end a right angle flange 37. As illustrated most clearly in FIG. 6, when the second bracket assembly 21 is mounted on the first bracket assembly 20, the bracket plates 35 are arranged outside the bracket plates 24 and the inner surfaces of the plates 35 engage the outer surfaces of the spacer bars 27 and the offset cam plates 30. Flanges 37 are provided for interconnecting the second bracket assembly 21 to the force or load-receiving member of the weighing apparatus, as illustrated in FIG. 2.

Bracket plates 35 of the second bracket assembly 21 are interconnected together by means of fasteners. Spacers 41 are received on the fasteners and arranged between the bracket plates 35 in order to maintain the bracket plates in spaced apart relation. Assembly of the bracket plates 35 would involve arranging the spacers 41 between the plates and aligned with holes formed in the plates which would receive the fasteners 40 that would be threadedly received in the opposite ends of the spacers, as can be appreciated by the exploded view of the parts in FIG. 5.

Each of the bracket plates 35 of the second bracket assembly 21 includes in its main body portion 36 a downwardly opening vertically oriented guide slot 43 which coacts with the guide pins 28 of the first bracket assembly. As can be seen particularly in FIG. 5, while the slots 43 are at the lower ends of the plate body portions, guide pins 45 are mounted at the upper ends of the main body portions 36 and in vertical alignment with the guide slots 43. The guide pins 45 coact with the guide slots 32 formed in the bracket plates 24 of the first bracket assembly. It can therefore readily be appreciated that the length of the guide slots 32 and 43 are such as to allow that amount of sliding movement between the bracket assemblies necessary for the operability of the overload protection device. Further it can be appreciated that the coacting guide slots and guide pins of the bracket assemblies, being arranged at the upper and lower parts of the assemblies, guide the relative movement between the assemblies generally along a vertical plane at all times including when the second bracket assembly 21 is eccentrically loaded. When the second or outer bracket assembly is in assembled relation with the first or inner bracket assembly, as seen in FIG. 3, the flanged pins 28 hold the plates 35 in position and prevent the plates from disengaging the pins.

In order to normally prevent sliding movement between the first and second bracket assemblies and also to cause transmission of any weighing force or load directly to the load cell, the bracket assemblies are connected together by the cam surfaces 31 on the cam plates 30 and a pair of cam pins 50 resiliently biased toward one another and mounted on the second bracket assembly 21 and which engage the cam surfaces of the cam plates. Adjacent each end of each cam pin a cylindrical in cross section cam portion 51 functions to coact with a cam surface 31 on a cam plate of the first bracket assembly. Additionally, these cam portions are received in retention slots 52 formed in the body portions 36 of the cam plates 35 which essentially retain the cam pins at the desired level relative the guide slots and guide pins for properly connecting the second bracket assembly relative the first bracket assembly. As the cam pins 50 move toward and away from each other, their movement is guided along the horizontal by the retention slots 52.

Slotted spring receiving heads 53 are formed at the outer ends of the cam pins adjacent the cam portions 51 and are positioned at the outside surfaces of the bracket plates 35. As seen in FIG. 6, coiled tension springs 54 with suitable end hooks are arranged at the outer surfaces of the cam plates 35 and for engaging the spring receiving heads 53 of the cam pins as illustrated for the purpose of exerting a biasing force on the cam pins to normally bias the pins toward one another. As seen particularly in FIG. 9, the cam portions 51 of the cam pins 50 are driven by the springs 54 into engagement with the cam surfaces 31 of the cam plates 30. This action produces a connection between the first and second bracket assemblies so that forces exerted on the second bracket assembly are transmitted to the first bracket assembly and ultimately to the load cell 11. Should the force exerted on the second bracket assembly exceed the combined force of the springs 54, it will cause the cam pins to move away from each other by the resistance of the cam surfaces to thereby prevent that force from being applied directly to the load cell. Accordingly, protection of the load cell is produced by the overload protection device which will prevent damage to the load cell. The guide slots and pins of the bracket assemblies will allow the relative sliding movement between the bracket assemblies in the event of an overload, while at the same time maintaining alignment between the bracket assemblies. Upon removal of the overload condition, the springs 54 cause the cam pins to draw together and return the bracket assemblies to the normal position relative each other so that the pins seat in the base of the cam surfaces, whereby the operation of the load cell is normal. Thus, the overload protection device is self-resetting.

Movement of the cam pins 50 during overload conditions is seen to be generally along the horizontal while movement between the bracket assemblies will be generally along the vertical. Thus, an excessive downward force applied to the second bracket assembly will bypass the load cell by the action of the connection means between the bracket assemblies, thereby preventing damage to the load cell which might be caused by excessive loading. Inasmuch as the cam surfaces 31 are relatively V-shaped and include both downwardly and upwardly sloping edges, the overload protection device of the invention will likewise protect the load cell against any excessive upward forces.

In the event the load cell is shipped or desired to be stored, the overload protection device of the present invention includes a feature whereby the load cell can be relieved of any external forces. The operability between the cam pins and the cam surfaces is negated by turning an adjusting screw 60 such as to move the cam pins away from each other a distance sufficient to eliminate any interaction between the cam pins of the second bracket assembly with the cam surfaces of the first bracket assembly. This adjusting screw includes a threaded portion 61 threadedly received in a tapped hole 62 of one of the cam pins 50. The free end 63 of the adjusting screw is freely rotatable in a bore 64 formed in the other cam pin 50, as particularly noted in FIG. 5. A washer 65 is mounted on the free end 63, as shown particularly in FIG. 7, whereby rotation of the adjusting screw 60 will force the cam pins 50 away from each other when the adjusting screw is turned in one direction and then allow the pins to be biased toward one another by the springs 54 when rotated in the other direction. A knob 66 is provided on one end of the adjusting screw 60 in order to facilitate rotation of the adjusting screw. A pair of nuts 67 are received on the threaded portion 61 for purposes of locking the adjusting screw in any desired position. These nuts may be conventionally rotated and locked in position against the cam pin 50 having the threaded bore.

The length of the bracket plates 35 of the second bracket assembly 21 is such that they provide a maximum relative movement between the first and second bracket assemblies in the event of an overload. This can be best appreciated in FIG. 2 where the lower ends of the bracket plates 35 can only travel to the base 13 of the unit. Thus, the excessive and unsafe load applied would be transmitted to a non-functional position when the bracket plates 35 seat against the base. It may be further appreciated that when the adjusting screw or rod is operated to disconnect the second bracket assembly from the first bracket assembly, the second bracket assembly with the weighing platform attached thereto can move to seated position where the plates 36 engage the base 13. Additionally, to thereafter place the weighing apparatus and load cell back in service, it is only necessary to operate the adjusting rod 60.

Accordingly, the overload protection device of the present invention protects the load cell against excessive loading that might damage the load cell but also functions to prevent external forces from being applied to the load cell when the load cell as utilized in a weighing apparatus is being shipped or placed in storage.

It will be understood that modifications and variations may be effected without departing from the scope of the novel concepts of the present invention, but it is understood that this application is to be limited only by the scope of the appended claims.

The invention is hereby claimed as follows:

1. In combination with a load cell, an overload protection device comprising first bracket means fixedly secured to the load cell at the load applying area thereof, second bracket means slidably mounted on said first bracket means and to which a load may be applied, and means on said second bracket means for producing a connection with said first bracket means such that the second bracket means will not slide relative the first bracket means until a predetermined load is applied to said second bracket means and will then slide until the load is transmitted to a support surface whereby the load cell is protected against overloading.

2. The overload protection device defined in claim 1, whereby said connection means includes means for resetting the relative positions of said first and second bracket means following the removal of an overload.

3. The overload protection device defined in claim 1, wherein said connection means includes means for disconnecting said second bracket means from said first bracket means to prevent any load from being applied to said load cell through said second bracket means.

4. The overload protection device defined in claim 1, which further includes guide means for guiding said second bracket means on said first bracket means during any slidable movement therebetween.

5. The overload protection device defined in claim 1, wherein said connection means includes cam surface means on said first bracket means and cam pin means carried by said second bracket means coacting with said cam surface means to normally prevent relative movement between said first and second bracket means.

6. The overload protection device defined in claim 1, wherein said connection means includes a plurality of cam surfaces on said first bracket means and a plurality of cam pins carried by said second bracket means coacting with said cam surfaces to normally prevent relative movement between said first and second bracket means.

7. The overload protection device defined in claim 1, wherein said first bracket means includes a pair of bracket plates rigidly secured to the load cell and said second bracket means includes a pair of interconnected bracket plates coacting with said plates of said first bracket means, and which further includes means for guiding any relative movement between said first and second bracket means.

8. The overload protection device defined in claim 7, wherein said connection means includes a pair of cam pins on said second bracket means, cam surfaces on said first bracket means coacting with said cam pins, and means for biasing said cam pins toward one another.

9. The overload protection device defined in claim 8, wherein said biasing means includes a pair of springs connected to the ends of the cam pins.

10. The overload protection device defined in claim 9, wherein said connection means further includes means for disconnecting said second bracket means from said first bracket means to prevent any forces applied to said second bracket means from being transmitted to said first bracket means and said load cell.

11. In combination with a weighing scale having a base and a weighing platform, a load cell secured to said base and having a load applying portion, and an overload protection device mounted between the weighing platform and the base, said device comprising a first bracket assembly rigidly secured to the load applying portion of the load cell, a second bracket assembly slidably and guidably received by said first bracket assembly, said second bracket assembly being rigidly secured to said weighing platform, and means connecting said bracket assemblies to prevent relative movement therebetween during normal loading of the cell and to permit relative movement in the event of a given load on the second bracket assembly so as to transmit the load directly to the base to protect the cell against damage.

12. The overload protection device defined in claim 11, wherein said connection means includes cam plate means on said first bracket assembly and cam member means on said second bracket assembly coacting with said cam plate means, and means for continually biasing said cam member means into engagement with said cam plate means.

13. The overload protection device defined in claim 12, wherein said connection means further includes means for nullifying said biasing means to allow free movement between said bracket assemblies when storing or shipping the scale to prevent any external forces being transmitted to the load cell.

14. The overload protection device defined in claim 12, wherein said connection means is self-resetting following the removal of an overload.

* * * * *